United States Patent [19]
Bradshaw

[11] Patent Number: 5,268,789
[45] Date of Patent: Dec. 7, 1993

[54] RETROREFLECTIVE ASSEMBLY AND PROCESS FOR MAKING SAME

[75] Inventor: Thomas I. Bradshaw, Afton

[73] Assignee: Minnesota Mining and Manufacturing Company, St. Paul, Minn.

[21] Appl. No.: 837,331

[22] Filed: Feb. 18, 1992

[51] Int. Cl.⁵ .............................................. G02B 5/126
[52] U.S. Cl. ..................................... 359/534; 359/536
[58] Field of Search ................ 359/534, 535, 536, 541

[56] References Cited

U.S. PATENT DOCUMENTS

| | | | |
|---|---|---|---|
| 2,713,286 | 7/1955 | Taylor | 88/82 |
| 3,556,637 | 1/1971 | Palmquist | 359/535 |
| 3,781,083 | 12/1973 | Eigenmann | 359/535 |
| 3,894,791 | 7/1975 | Eigenmann | 359/535 |
| 3,964,820 | 6/1976 | Eigenmann | 359/534 |
| 3,964,821 | 6/1976 | Eigenmann | 359/535 |
| 4,072,403 | 2/1978 | Eigenmann | 359/535 |
| 4,108,536 | 8/1978 | Eigenmann | 359/535 |
| 4,148,561 | 4/1979 | Eigenmann | 359/535 |
| 4,411,553 | 10/1983 | Eigenmann | 359/536 |
| 4,763,985 | 8/1988 | Bingham | 359/536 |
| 4,957,335 | 9/1990 | Kuney, Jr. | 359/541 |
| 5,008,142 | 4/1991 | Wilson et al. | 359/536 |

OTHER PUBLICATIONS

Patent Abstracts of Japan, vol. 10, No. 64, Mar. 14, 1986, and JP A 60 205 501, Oct. 17, 1985.
Vedam, K. and Stoudt, M. D., "Retroreflection from spherical glass beads in highway pavement markings. 2: Diffuse reflection (a first approximation calculation)," *Applied Optics*, vol. 17, No. 12, Jun. 15, 1978, pp. 1859–1869.

*Primary Examiner*—Loha Ben
*Attorney, Agent, or Firm*—Gary L. Griswold; Walter N. Kirn; Robert H. Jordan

[57] ABSTRACT

Retroreflective assembly comprising:

a) a transparent globule having a first, uncoated part-spherical surface portion for reception of incident light; a second, substantially flat surface portion opposite the first surface portion; and a third, toroidal surface portion intermediate the first and second surface portions, the toroidal surface having a radius of curvature smaller than the radius of curvature of the first part-spherical surface portion;

b) a monolayer of externally reflecting transparent microspheres for focusing and retroreflecting light beams incident upon the first surface portion and which have passed through, the globule, the monolayer being applied to the second surface portion and to at least a part of the toroidal surface portion; and c) a layer of diffuse reflecting pigment disposed behind the monolayer of microspheres.

Optionally, a space coat is interposed between the monolayer and the diffuse reflecting pigment. In some embodiments, fluorescent pigment is used.

20 Claims, 1 Drawing Sheet

RETROREFLECTIVE ASSEMBLY AND PROCESS FOR MAKING SAME

FIELD OF INVENTION

The present invention relates to retroreflective assemblies of the type disclosed in U.S. Pat. No. 4,072,403 (Eigenmann), pavement markings incorporating such assemblies, and methods for making such assemblies.

BACKGROUND

Pavement markings of various forms (e.g., paints, tapes, and individually mounted articles) are well known to guide and direct motorists as they travel along a highway. During the daytime, the markings, which are typically of selected distinctive color(s), may be sufficiently visible under ambient light to effectively signal and guide a motorist. At night, however, especially when the primary source of illumination is the motorist's vehicle headlights, the colors of the markings are generally insufficient to adequately guide a motorist. For this reason, pavement markings with retroreflective properties have been employed.

U.S. Pat. No. 4,072,403 (Eigenmann) discloses a retroreflective assembly useful in pavement marking applications that is particularly useful for situations in which retroreflection is required under raining and/or condensing environmental conditions. The assembly disclosed therein comprises a transparent globule having a first, uncoated partspherical surface portion positioned to be impinged by light rays, a second substantially flat surface portion opposite the first surface portion, and a third, toroidal surface portion intermediate between the first and second surface portions. The toroidal surface has a radius of curvature considerably smaller than that of the first part-spherical surface portion. A monolayer of transparent microspheres, with a reflective layer therebehind, disposed on the flat portion and at least a part of the toroidal surface portion of the globule serves to focus and retroreflect light beams that are incident to the first spherical surface portion of the globule and then pass through the globule to the toroidal or flat surfaces. The microspheres serve to redirect light back through the globule, exiting the upper surface so as to return towards the illumination source. The retroreflective assemblies disclosed in the patent, sometimes referred to as "globule/microsphere retroreflective assemblies", provide effective retroreflection of light at low incidence angles, making them well-suited for horizontal applications such as pavement surfaces.

U.S. Pat. No. 4,072,403 also discloses a method for production of such assemblies wherein a flat sheet material is passed through calendering and forming rolls to produce a web of globules with the spherical surface of the globules arising from one surface of the web and the flat and toroidal surfaces arising from the opposite side of the web. The resultant globules remain interconnected by a thin, breakable portion of the sheet. The position of the interconnection on individual globules is determined by the dimensions and spacing of the calendering and forming rolls. It is typically preferred that the interconnection be at about the boundary of the first, part-spherical surface portion and the third, toroidal portion of the globules. Production of the assembly further requires application of transparent binder material to the toroidal and flat side of the globules, followed by application of a monolayer of microspheres. Next, a very thin layer of transparent binder material is applied, e.g., by spraying, over the monolayer of microspheres. Throughout the remaining discussion, this second layer of transparent binder material is referred to as a "space coat", its function being to separate the reflective layer described below from the microspheres. Finally, a reflective layer is applied over the space coat, e.g., by spray metallization. The web may be then broken either into arrays of a plurality of assemblies or into individual assemblies, each comprising a single globule. The assemblies or arrays can be applied either to painted surfaces on the roadway or incorporated in pavement markings for subsequent application to a pavement surface. The Minnesota Mining and Manufacturing Company ("3M") distributes such assemblies under the trade designations GLOBEAD ™ (single assembly in each unit) and GLOGUIDE ™ Wet Reflective Elements (plurality of assemblies in each unit).

Retroreflective assemblies produced according to U.S. Pat. No. 4,072,403 have failed to exhibit the full potential retroreflective brightness which is theoretically expected from the optics of the assembly. Commercial production has resulted in unacceptably high amount of unsatisfactory assemblies that must be rejected as scrap. The webs from which globule/microsphere assemblies are formed are typically somewhat stiff and boardy and many vapor coating processes for application of aluminum reflector layers entail passing webs around rollers. As a result the web may crack during application of the metal reflective layer, yielding arrays of assemblies of irregular and undesired size. Furthermore, even when acceptable assemblies and arrays have been produced, they exhibit a pronounced directionality of efficiency of retroreflection. By "directionality" it is meant that the efficiency of retroreflection is significantly different in one orientation than another. In addition, the assemblies and arrays typically have a pronounced gray cast when viewed under daylight conditions. In addition to being aesthetically unappealing, this gray cast tends to detract from the conspicuity of pavement markings bearing such assemblies and arrays during daylight conditions.

Thus, there exists a need for an improved globule/microsphere retroreflective assembly of the type disclosed in U.S. Pat. No. 4,072,403 as well as an improved method for making such an assembly.

SUMMARY OF INVENTION

The present invention provides retroreflective assemblies which exhibit exceptional retroreflectivity even when wet. The present invention also provides a method for making such assemblies which offers improved efficiency.

In brief summary, each retroreflective assembly of the invention comprises:

a) a transparent globule having a first, uncoated part-spherical surface portion for reception of incident light; a second, substantially flat surface portion opposite the first surface portion; and a third, toroidal surface portion intermediate the first and second surface portions, the toroidal surface portion having a radius of curvature smaller than the radius of curvature of the first part-spherical surface portion; and b) a monolayer of externally reflecting transparent microspheres for focusing and retroreflecting light beams incident upon the first surface portion and which have passed through the globule, the monolayer being applied to the second surface portion and to at least a part of the toroidal surface portion.

The retroreflective assemblies provided herein differ from those known previously in that they comprise a layer of diffuse reflecting pigment disposed behind the monolayer of microspheres. In some embodiments, a space coat is interposed between the monolayer and the layer of diffuse reflecting pigment. In some embodiments, fluorescent pigment is used.

Retroreflective assemblies of the invention and those of the aforementioned U.S. Pat. No. 4,072,403 are collectively referred to herein as "globule/microsphere retroreflective assemblies".

Globule/microsphere retroreflective assemblies of the invention and arrays of such assemblies exhibit a more aesthetically appealing, improved color, without undesirable grayness, and more uniform retroreflective efficiency than do the globule/microsphere assemblies and arrays from U.S. Pat. No. 4,072,403. The method of the invention is more easily performed than that known previously, and results in lower scrap rates, making more cost effective performance possible.

During investigations of the causes of directionality in the retroreflective assemblies produced according to the aforementioned U.S. Pat. No. 4,072,403, it was observed that the variation in efficiency of retroreflectivity correlated strongly with variations in the thickness of the space coat. The variation in space coat thickness results from the difficulty of spraying a reliably controlled thickness of transparent space coat material onto the toroidal surface portions of the globules. Careful analysis revealed that under typical production conditions, although the application of space coat material was under sufficient control to provide a substantially uniform and optimal thickness coating on the microspheres on the flat portions of the globules, the space coat on the microspheres on the toroidal portions of the globules was not of uniform thickness and not of optimal thickness for retroreflection.

Furthermore, it was theorized that the directionality of retroreflective efficiency exhibited by completed assemblies was a result of relative movement of the web past the sprayers applying space coat material. Rather than being oriented perpendicular to the web, the sprayers are typically oriented so as to apply material at an angle, e.g., 10° to 45°, from perpendicular and facing the advancing web such that the toroidal surface portions on the leading edges of the globules received thicker coatings of space coat material than did the toroidal surface portions of the trailing edges of the globules. This discovery was verified by controlled application of additional space coat material to both the leading edge and trailing edge toroidal surface portions and subsequent evaluation of retroreflective performance. Such controlled application served to 1) reduce the directionality of retroreflectivity and 2) improve the efficiency of retroreflectivity of the microspheres on both edge toroidal surface portions. Thus, a significant discovery was that the thickness of the space coat on the microspheres on the toroidal surface portions was a highly critical yet difficult to control parameter in production of the retroreflective assembly.

A more surprising discovery was that although the space coat thickness on the microspheres at the toroidal surface portions of the globule is critical in the case of globule/microsphere assemblies having specular reflective layers, the criticality of the space coat thickness is eliminated through the use of a diffuse pigment reflector in accordance with the present invention. As a result of this discovery, novel globule/microsphere retroreflective assemblies which exhibit surprising performance and a novel method for making such assemblies are provided.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
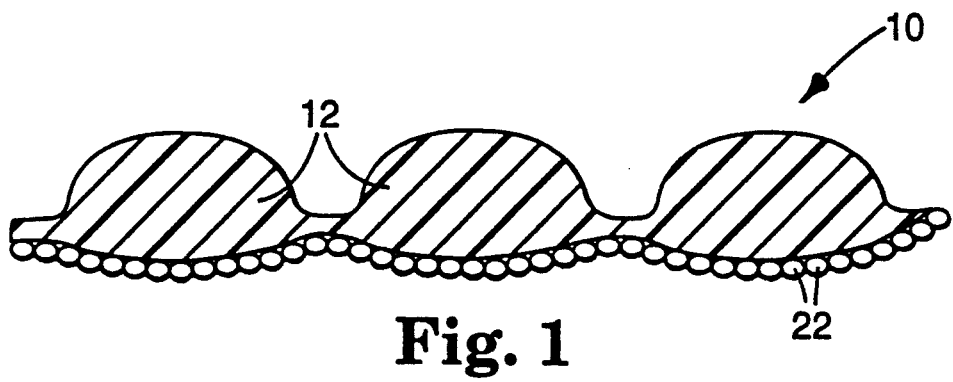
FIG. 1 is a cross-section of a portion of an illustrative array of retroreflective assemblies of the invention.

Shown in FIG. 1 is illustrative array 10 made up of a plurality of globule/microsphere retroreflective assemblies of the invention 12.

Figure 2:
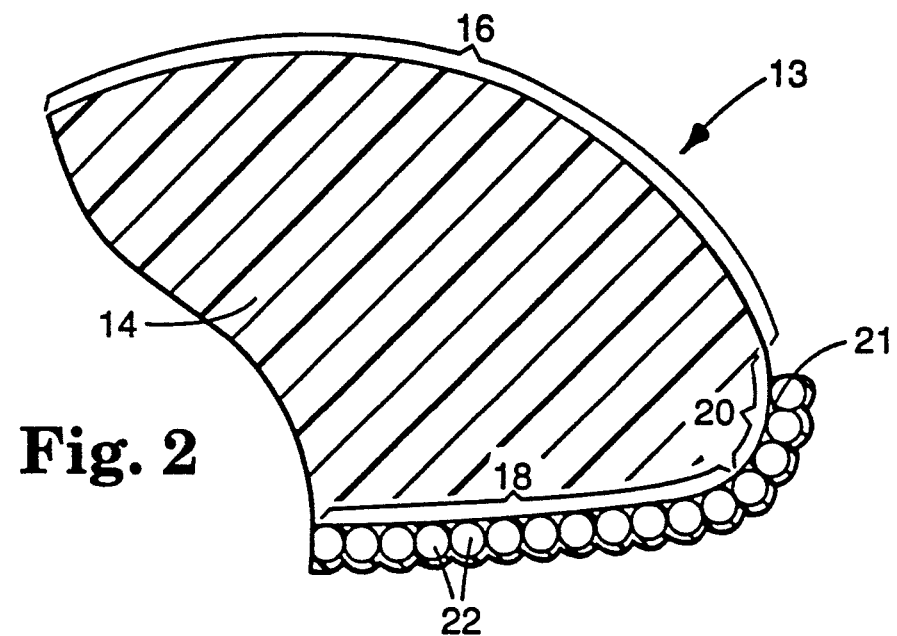
FIG. 2 is a cross-section of a portion of an illustrative retroreflective assembly of the invention.
Figure 3:
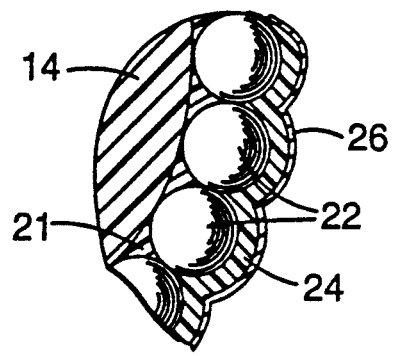
FIG. 3 is an enlarged cross-section of a portion of the assembly of FIG. 2.

Shown in FIG. 2 is illustrative globule/microsphere retroreflective assembly 13 which comprises transparent globule 14 having first, uncoated part-spherical surface portion 16 for reception of incident light; second, substantially flat surface portion 18 opposite first surface portion 16; and third, toroidal surface portion 20 intermediate the first and second surface portions. Toroidal surface portion 20 has a radius of curvature smaller than the radius of curvature of first, partspherical surface portion 16. On second surface portion 18 and at least part of toroidal surface portion 20 is a monolayer of transparent microspheres 22 secured with transparent binder layer 21. Referring to FIG. 3, the monolayer of microspheres is typically covered by optional, transparent space coat 24. Behind microspheres 22, on the back surface of space coat 24, in embodiments having such members, and on microspheres 22 in other embodiments, is diffuse reflecting layer 26.

As shown in FIGS. 12 and 13 of U.S. Pat. No. 4,072,403, light which is incident the first surface portion of the globule is refracted through the globule to a portion of the surface of the globule bearing microspheres, where it passes through microspheres to be focused upon a reflective layer and reflected back through the optional space coat, microspheres, binder layer, and globule. As used herein, the forward direction is used to refer toward the light source, e.g., an automobile headlight, and the backward or rear direction is opposite thereto. Thus, the reflective layer is "behind" the monolayer of microspheres.

The globules, binder material, microspheres, and space coat in assemblies of the invention may be made of the same materials and formed in the same way as disclosed in the aforementioned U.S. Pat. No. 4,072,403 which is incorporated herein by reference in its entirety.

Illustrative examples of materials from which globules can be made include acrylics and polycarbonates. Acrylics are often preferred because they are more easily polished by repeated impacts of rubber tires, thereby removing scratches such as are caused by grit.

A critical distinction between globule/microsphere assemblies of the invention and those of the patent is the reflective layer which is used in assemblies of the invention. Furthermore, unlike in the assemblies of the patent, the thickness of the space coat is not critical to retroreflective performance of the assemblies of the invention and may, if desired, be omitted entirely. In embodiments of the invention having space coats, the space coat typically has a thickness equivalent to a basis weight of between about 10 and about 15 grams/meter$^2$. "Basis weight" of the space coat is used herein to refer to the coating weight of an equivalent thickness of a uniform layer space coat material on a flat surface.

The reflective layer of assemblies of the invention comprises diffuse reflecting pigments. Illustrative examples of suitable compositions for forming diffuse reflecting layers are latex paint, white water-based acrylic paint, and correcting fluid. Preferably, the coating composition is a latex paint with a high pigment loading to provide high retroreflection. A commonly used pigment is titanium dioxide. Another suitable source of coating composition is a correcting or opaquing fluid such as the LIQUID PAPER TM Correction Fluid available from Gillette Company.

Fluorescent pigments dispersed in a latex paint with a diffuse reflector, such as titanium dioxide, can also be used. Daylight fluorescent pigments, i.e., those that emit visible light when illuminated with ultraviolet radiation, can be used to impart great brightness to the assemblies of the invention, particularly in applications where they will be illuminated with ultraviolet radiation sources. In an illustrative embodiment, Blaze Orange daylight fluorescent pigment in a water-based acrylic white paint provided satisfactory retroreflectivity when viewed with a flashlight. The Blaze Orange samples appeared roughly as efficient as the white paint-coated samples, although they appeared to include a slight pinkish cast. When the Blaze Orange samples were viewed with a UV lamp, they appeared to be highly colored and were activated by UV light sources so as to emit visible wavelength light.

It is believed that pearlescent pigments can be used in diffuse reflective layers of the invention. Pearlescent pigments are well known to consist of many small platelets, with the reflection from the surfaces of the platelets providing the pearlescent appearance of such pigments.

Preferably the pigment is in a solvent free carrier, or a carrier that does not contain solvents which would degrade the binder material or optional space coat.

If desired, globule/microsphere preassemblies may be prepared and applied to suitable pavement markings to yield retroreflective globule/microsphere assemblies of the invention. The preassemblies, comprising the globule, binder, microspheres, and optional space coat, as described above, can be placed on the surface of a pavement marking, e.g., the urethane based top coat of a marking tape. The top coat, which should comprise a diffuse reflecting pigment, functions as the reflective layer of the thusly completed retroreflective assembly. For instance, a preassembly as just described may be laid upon the surface of a layer of uncured urethane containing titanium dioxide pigment (e.g., a conventional pavement marking top coat) such that the urethane layer is behind the microspheres. After the urethane is cured, the preassembly is securely bonded to the urethane layer and efficient retroreflection is provided. If the resulting product is to be used as a composite pavement marking sheeting, then the addition of skid-resisting particles (for example, sand) and other forms of retroreflective elements (such as reflectorized glass beads) are optionally added to the uncured urethane.

Typically, however, it is preferred that completed globule/microspheres retroreflective assemblies, complete with a diffuse reflective layer, be applied to the top coats of pavement markings rather than using preassemblies as discussed above. For example, a globule/microsphere reflective assembly having a titanium dioxide diffuse reflector pigment coating may be placed on an uncured urethane top coat containing a yellow pigment. Better control over ambient appearance and retroreflective efficiency can be achieved using completed assemblies. Also, bubbles in the top coat may become trapped under the globule preassembly, thereby impairing its retroreflective performance.

By way of contrast, a commercial pavement marking strip employing aluminum vapor-coated globule/microsphere assemblies were similarly embedded in the urethane top coat of a pavement marking strip.

The two just-described embodiments of the present invention (i.e., the preassembly and completed assembly) outperformed the retroreflectivity of the pavement marking sheet having the retroreflective assemblies with aluminum vapor coating, had a more attractive appearance under ambient light conditions, and had eliminated an expensive and time consuming aluminum vapor-coating step which heretofore was thought to be an absolute necessity for the production of effective retroreflective assemblies.

If desired, globules containing colorants, e.g., dyes and/or pigments, may be used in assemblies of the invention. Such assemblies provide retroreflection in the desired color, e.g., yellow, red, blue, green, or orange. Selection of colorant(s) and useful loadings thereof may be readily made by those skilled in the art.

To compare the unexpected changes in performance attained by using a diffuse retroreflective layer rather than a specular reflective layer as in previously known globule/microsphere retroreflective assemblies, the retroreflective performance of assemblies with aluminum reflective layers, with no reflective layer, and with a diffuse reflective layer, at space coat thicknesses were compared. The following results were obtained (space coat basis weight, in grams/meter$^2$, normalized to flat surface, and retroreflective brightness, in candela/meter$^2$/lux), with assemblies having the same globules, binder layer, microspheres, and space coat as indicated. Retroreflective brightness was measured from two directions corresponding to the leading edge and trailing edges of the web during spray application of the space coat. No measurable difference between the two directions was observed with the assemblies of the invention which had a white paint reflective layer (TRU-TEST TM Vinyl-Acrylic Latex Housepaint, from General Paint and Chemical Company, Chicago, Ill., labelled as 31.1 weight percent pigment (identified as titanium dioxide Type 3, 16.8 weight percent, silicates, 11.9 weight percent, zinc oxide, 2.3 weight percent)).

| Space Coat | Reflective Layer | | | | | |
|---|---|---|---|---|---|---|
| | Aluminum | | None | | White Paint | |
| | A | B | A | B | A | B |
| 14 | 3.5 | 0.7 | 1.6 | 0.9 | 6.1 | 6.1 |
| 18 | 4.1 | 1.5 | 2.0 | 1.8 | 6.8 | 6.8 |
| 22 | 9.0 | 2.4 | 2.1 | 2.4 | 7.6 | 7.6 |
| 26 | 15.1 | 10.3 | 2.5 | 1.9 | 7.9 | 7.9 |
| 30 | 21.2 | 21.8 | 1.8 | 1.8 | 6.6 | 6.6 |
| 40 | 21.2 | 13.1 | 1.3 | 1.3 | 4.7 | 4.7 |

The relative space coat measurement was obtained by measuring the amount of space coat material sprayed onto a glass plate under similar production conditions to that being employed on a web of retroreflective assemblies. The retroreflective assemblies of the invention provided substantially uniform retroreflective performance over a range of space coat thicknesses whereas the assemblies with aluminum reflective layers exhibited dramatic variation in performance with varying space coat thickness.

Prototype retroreflective assemblies of the present invention were initially prepared from 3M Brand GLOGUIDE ™ Retroreflective Elements which had been vapor-coated with aluminum to provide a metal reflective layer. After noting the retroreflective efficiency, the aluminum vapor coat was removed by etching with a 5 weight percent aqueous sodium hydroxide solution. After the aluminum was removed, LIQUID PAPER Brand opaquing fluid was brushed on over the space coat. The resultant array of the invention had noticeably more efficient retroreflectivity than did the original aluminum vapor-coated array.

Repetition of the process upon 3M Brand GLOGUIDE ™ Retroreflective Elements with varying amounts of space coat exhibited significantly less variation in retroreflective efficiency when another diffuse reflective pigment, latex paint with titanium dioxide, was applied over the space coat.

It was noted that aluminum vapor-coated samples which had previously been specially prepared with thicker space coat layers provided extremely high retroreflectivity while the retroreflectivity of the samples having diffuse reflective pigments remained relatively constant as shown in the table above.

Various modifications and alterations of this invention will become apparent to those skilled in the art without departing from the scope and spirit of this invention.

What is claimed is:

1. A retroreflective assembly comprising:
   a) a transparent globule having a first, uncoated part-spherical surface portion for reception of incident light; a second, substantially flat surface portion opposite said first surface portion; and a third, toroidal surface portion intermediate said first and second surface portions, said toroidal surface portion having a radius of curvature smaller than the radius of curvature of said first part-spherical surface portion;
   b) a monolayer of externally reflecting transparent microspheres for focusing and retroreflecting light beams incident upon said first surface portion and which have passed through said globule, said monolayer being applied to said second surface portion and to at least a part of said toroidal surface portion; and
   c) a layer of diffuse reflecting pigment disposed behind said monolayer of microspheres.

2. The retroreflective assembly of claim 1 further comprising a space coat interposed between said monolayer of microspheres and said layer of diffuse reflecting pigment.

3. The retroreflective assembly of claim 2 wherein said space coat has a basis weight of between about 10 and about 15 grams/meter$^2$.

4. The retroreflective assembly of claim 1 wherein said diffuse reflecting pigment layer contains one or more of the following: titanium dioxide, magnesium oxide, calcium carbonate, and pearlescent pigment.

5. The retroreflective assembly of claim 1 wherein said diffuse reflecting pigment is carried by a urethane matrix.

6. The retroreflective assembly of claim 1 wherein said diffuse reflecting pigment layer includes latex.

7. The retroreflective assembly of claim 1 wherein said transparent globule includes a light-absorbing dye.

8. The retroreflective assembly of claim 7 wherein said globule is an acrylic globule including a dye.

9. The retroreflective assembly of claim 1 wherein said diffuse reflecting pigment includes a fluorescent material.

10. The retroreflective assembly of claim 1 wherein said layer of diffuse reflecting pigment is the top layer of a pavement marking tape.

11. An array comprising a plurality of the retroreflective assemblies of claim 1.

12. A pavement marking sheet comprising:
   a) a urethane matrix top coat containing diffuse reflecting pigment; and
   b) a retroreflective assembly embedded in the top coat, the retroreflective assembly comprising:
      1) a transparent globule having a first, uncoated part-spherical surface portion for reception of incident light; a second, substantially flat surface portion opposite the first surface portion; and a third, toroidal surface portion intermediate said first and second surface portions, said toroidal surface portion having a radius of curvature smaller than the radius of curvature of the first, part-spherical surface portion;
      2) a monolayer of externally reflecting transparent microspheres for focusing and retroreflecting light beams incident upon said first surface portion and which have passed through said globule, said monolayer being applied to said second surface portion and at least to a part of said toroidal surface portion.

13. The pavement marking sheet of claim 12 wherein said embedded retroreflective assembly further includes a layer of diffuse reflecting pigment superimposed on the monolayer of microspheres.

14. A method of preparing a retroreflective assembly, said method comprising the steps of:
   a) providing a web of transparent globules, each of said globules having a first part-spherical surface portion protruding from a first side of the web and a second substantially flat surface portion and a toroidal surface portion projecting from a second side of the web, the toroidal surface portion having a radius of curvature generally smaller than the radius of curvature of the first part-spherical portion, and the second surface portion and at least a part of the toroidal surface portion bearing a monolayer of externally reflecting transparent microspheres for focusing and retroreflecting light beams incident upon the first surface portion and which have passed through said each of said globules; and
   b) applying a layer of diffuse reflecting pigment over said monolayer of microspheres.

15. The method of claim 14 further comprising the step of applying a space coat upon said monolayer of microspheres prior to the step of applying said diffuse reflecting pigment.

16. The method of claim 14 wherein said diffuse reflecting pigment is applied in a liquid carrier.

17. The method of claim 16 wherein said liquid carrier includes latex.

18. The method of claim 14 wherein said pigment is titanium dioxide.

19. The method of claim 14 wherein said pigment is a fluorescent pigment.

20. The method of claim 14 wherein said diffuse reflecting pigment is carried in a urethane matrix.

* * * * *

UNITED STATES PATENT AND TRADEMARK OFFICE
CERTIFICATE OF CORRECTION

PATENT NO. : 5,268,789
DATED     : December 7, 1993
INVENTOR(S) : Thomas I. Bradshaw It is certified that error appears in the above-indentified patent and that said Letters Patent is hereby corrected as shown below:

On the Title Page, item [57], paragraph b, fourth line, delete the comma after the word "through."

In Column 1, Line 30, the word "partspherical" should read --part-spherical--.

In Column 4, Line 33, the word "partspherical" should read --part-spherical--.

Signed and Sealed this

Twelfth Day of July, 1994

Attest:

BRUCE LEHMAN

Attesting Officer     Commissioner of Patents and Trademarks